United States Patent
Dinter

(10) Patent No.: US 8,757,014 B2
(45) Date of Patent: Jun. 24, 2014

(54) GEAR MECHANISM FOR INDUSTRIAL APPLICATIONS OR WIND POWER PLANTS

(75) Inventor: Ralf Martin Dinter, Gelsenkirchen (DE)

(73) Assignee: Siemens Aktiengesellschaft, München (DE)

( * ) Notice: Subject to any disclaimer, the term of this patent is extended or adjusted under 35 U.S.C. 154(b) by 180 days.

(21) Appl. No.: 13/387,303

(22) PCT Filed: Jul. 20, 2010

(86) PCT No.: PCT/EP2010/060473
§ 371 (c)(1), (2), (4) Date: Jan. 26, 2012

(87) PCT Pub. No.: WO2011/012497
PCT Pub. Date: Feb. 3, 2011

(65) Prior Publication Data
US 2012/0160037 A1  Jun. 28, 2012

(30) Foreign Application Priority Data
Jul. 27, 2009  (DE) .......................... 10 2009 034 832

(51) Int. Cl.
*G01L 3/02* (2006.01)

(52) U.S. Cl.
USPC .................................. 73/862.335; 73/862.08

(58) Field of Classification Search
USPC .......... 73/862.08, 862.331–862.335, 862.324
See application file for complete search history.

(56) References Cited

U.S. PATENT DOCUMENTS

| | | | | |
|---|---|---|---|---|
| 4,370,631 | A * | 1/1983 | Gerber et al. | 333/106 |
| 4,699,198 | A * | 10/1987 | Schultheiss | 164/151.2 |
| 4,765,434 | A * | 8/1988 | Kawamoto et al. | 180/249 |
| 4,767,925 | A * | 8/1988 | Kawamoto | 250/231.16 |
| 5,001,937 | A | 3/1991 | Bechtel | |
| 5,369,583 | A | 11/1994 | Hazelden | |
| 5,490,430 | A | 2/1996 | Anderson | |
| 6,387,007 | B1 * | 5/2002 | Fini, Jr. | 475/268 |
| 6,736,233 | B2 * | 5/2004 | Beishline et al. | 180/334 |
| 7,219,879 | B2 * | 5/2007 | Jackson et al. | 254/276 |

(Continued)

FOREIGN PATENT DOCUMENTS

| | | |
|---|---|---|
| CN | 200979469 Y | 11/2007 |
| DE | 3804389 A1 | 8/1989 |

(Continued)

*Primary Examiner* — Max Noori
(74) *Attorney, Agent, or Firm* — Henry M. Feiereisen LLC

(57) ABSTRACT

The invention relates to a gear mechanism comprising at least one drive shaft and at least one output shaft, which enter a gear mechanism housing through a respective opening. The drive shaft and/or the output shaft comprise a magnetically or optically coded section in the region of the respective opening. The coding in said section may be changed by the effect of a torque or a force on the drive shaft or output shaft. Moreover, at least one gear wheel connected to the drive shaft and at least one gear wheel connected to the output shaft are provided that are directly or indirectly engaged with one another. In addition, the gear mechanism according to the invention comprises at least one scanning unit for detecting the magnetic or optical coding of the drive shaft or output shaft in a contact free fashion. The scanning unit is disposed in a housing cover surrounding the magnetically or optically coded section of the drive shaft or output shaft and connected electrically to an analysis unit for detecting an overload of the gear mechanism.

18 Claims, 5 Drawing Sheets

(56) References Cited

U.S. PATENT DOCUMENTS

| | | |
|---|---|---|
| 7,677,114 B2 * | 3/2010 | Deshmukh et al. ...... 73/862.328 |
| 8,128,525 B2 | 3/2012 | Dinter |
| 2001/0035056 A1 | 11/2001 | Garshelis |
| 2002/0125094 A1 * | 9/2002 | Zimmermann et al. ..... 192/3.58 |
| 2003/0015590 A1 | 1/2003 | Chen |
| 2012/0299586 A1 * | 11/2012 | Martin et al. ............ 324/207.25 |

FOREIGN PATENT DOCUMENTS

| | | |
|---|---|---|
| EP | 1930855 A2 | 6/2008 |
| EP | 1706709 B1 | 9/2009 |
| GB | 2385425 A | 8/2003 |
| WO | WO 9921150 A2 | 4/1999 |
| WO | WO 0218879 A1 | 3/2002 |
| WO | WO 2004026559 A1 | 4/2004 |
| WO | WO 2006013089 A1 | 2/2006 |

* cited by examiner

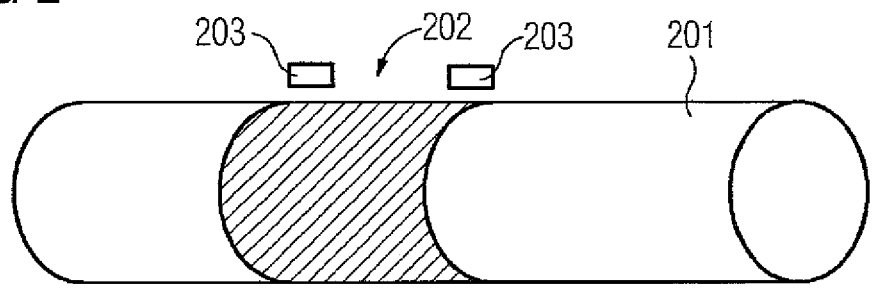
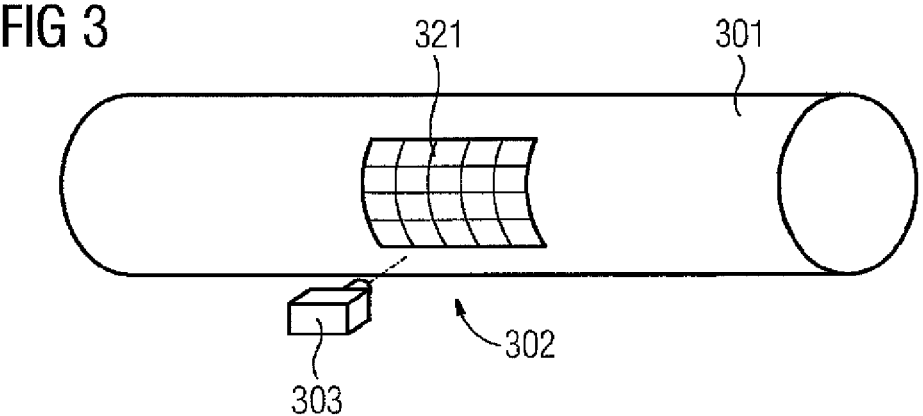
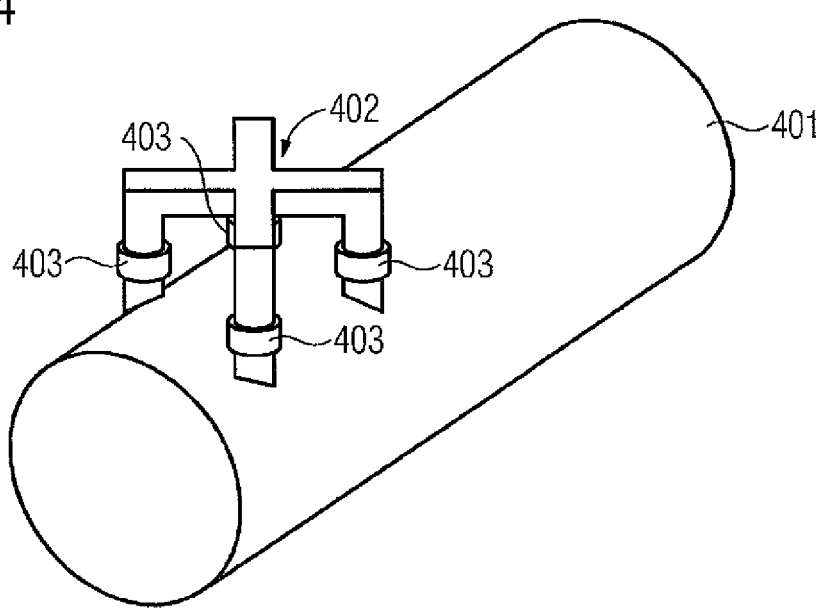

GEAR MECHANISM FOR INDUSTRIAL APPLICATIONS OR WIND POWER PLANTS

CROSS-REFERENCES TO RELATED APPLICATIONS

This application is the U.S. National Stage of International Application No PCT/EP2010/060473, filed Jul. 20, 2010, which designated the United States and has been published as International Publication No. WO 2011/012497 and which claims the priority of German Patent Application, Serial No. 10 2009 034 832.8, filed Jul. 27, 2009, pursuant to 35 U.S.C. 119(a)-(d).

BACKGROUND OF THE INVENTION

In many cases, gear mechanisms for industrial applications, in particular planetary gear mechanisms, are of central importance in industrial machining and manufacturing processes. A wide range of complex requirements is placed on industrial gear mechanisms. For example, one of these requirements is reliable operation, which must be guaranteed over a long period of use with minimal maintenance effort.

Particularly in wind power plants, gear mechanisms are subjected to a dynamic load sequence of turning and bending moments as well as axial and radial forces while in use. Load spectra which are defined by the user are used to design gear mechanisms. Real loads which deviate from these can shorten the useful life and cause interruptions to machining, manufacturing or power generation processes.

SUMMARY OF THE INVENTION

The present invention is based on the object of creating a gear mechanism which enables impending overloads of the gear mechanism to be reliably detected, and measures for their avoidance to be initiated.

According to the invention, this object is achieved by a gear mechanism for industrial applications or wind power plants, which includes at least one drive shaft and at least one output shaft which enter a gear mechanism housing through a respective opening, wherein the drive shaft and/or the output shaft have/has a magnetically or optically coded section in a region of the respective opening, the coding of which section may be changed by the effect of a torque and/or a force on the drive shaft or output shaft, at least one gear wheel connected to the drive shaft and at least one gear wheel connected to the output shaft which are directly or indirectly engaged with one another, at least one scanning unit disposed in a housing cover surrounding the magnetically or optically coded section of the drive shaft or output shaft for detecting the magnetic or optical coding of the drive shaft or output shaft in a contact-free fashion, an analysis unit, which is electrically connected to the at least one scanning unit for detecting an overload of the gear mechanism. Advantageous developments of the present invention are specified in the dependent claims.

The gear mechanism according to the invention comprises at least one drive shaft and at least one output shaft which enter a gear mechanism housing through a respective opening. The drive shaft and/or the output shaft have a magnetically or optically coded section in a region of the respective opening. The coding of said section may be changed by the effect of a torque and/or a force on the drive shaft or output shaft. Moreover, at least one gear wheel connected to the drive shaft and at least one gear wheel connected to the output shaft are provided and are directly or indirectly engaged with one another. In addition, the gear mechanism according to the invention comprises at least one scanning unit for detecting the magnetic or optical coding of the drive shaft or output shaft in a contact-free fashion. The scanning unit is disposed in a housing cover surrounding the magnetically or optically coded section of the drive shaft or output shaft and electrically connected to an analysis unit for detecting an overload of the gear mechanism. In this way, the present invention enables impending overloads of the gear mechanism to be reliably detected, and measures for their avoidance to be initiated. In particular, disposing the scanning unit in a housing cover which, as an integral component, can undertake measuring, bearing and sealing functions, provides improved protection for the gear mechanism measuring sensors and a reduction in assembly effort and manufacturing costs.

BRIEF DESCRIPTION OF THE DRAWING

The present invention is described in more detail below based on an exemplary embodiment with reference to the drawing. In the drawing FIG. 2 shows a perspective view of a shaft section with magnetic coding, FIG. 3 shows a perspective view of a scanning unit with an excitation coil and a plurality of measuring coils, FIG. 4 shows a perspective view of a shaft section with optical coding.

DETAILED DESCRIPTION OF PREFERRED EMBODIMENTS

Figure 1:
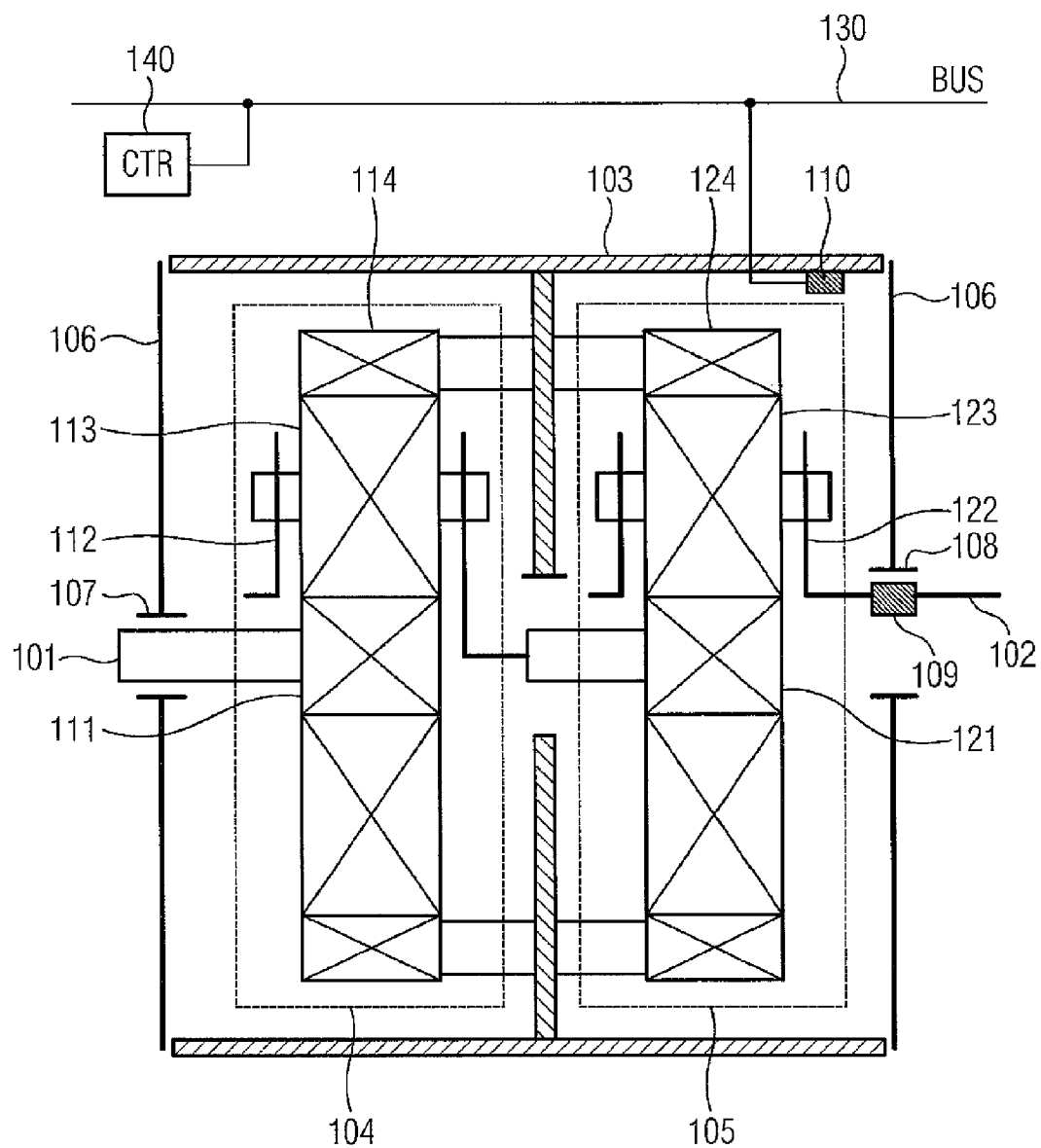
FIG. 1 shows a schematic representation of a gear mechanism according to the invention.

The gear mechanism shown by way of example in FIG. 1 comprises a drive shaft 101 and an output shaft 102 which are mounted in a gear mechanism housing 103. The drive shaft 101 is connected to a sun gear 111 of a first planetary stage 104, while the output shaft 102 is connected to a planet-gear carrier 122 of a second planetary stage 105 comprising a plurality of planet gears 123. Moreover, the first planetary stage 104 comprises a planet-gear carrier 112 which accommodates a plurality of planet gears 113 that mesh with a fixed ring gear 114 and is connected to a sun gear 121 of the second planetary stage 105. The second planetary stage 105 likewise has a fixed ring gear 124 which meshes with the planet gears 123 of the second planetary stage 105.

The gear mechanism housing 103 is sealed by means of a housing cover 106 on each face side. The housing covers 106 have mountings or guide elements for bearings 107, 108 of the drive shaft 101 and output shaft 102. In the present exemplary embodiment, a torque sensor 109, which is electrically connected to an analysis unit 110, is provided in the region of the bearing 108 of the output shaft 102. Sensors for detecting forces, bending moments or positions can also be provided instead of or in addition to a torque sensor. The analysis unit 110 is used particularly for detecting an overload of the gear mechanism. In addition, a torque sensor could also be provided in the region of the bearing 107 of the drive shaft 101. The torque sensor 109 comprises a magnetically or optically coded section of the drive shaft or output shaft and a scanning unit for detecting the magnetic or optical coding of the drive shaft or output shaft in a contact-free fashion.

The analysis unit 110 comprises a memory unit for recording a gear mechanism load characteristic. The torque or force measurements representing the gear mechanism load characteristic are stored in the memory unit as load spectra. In doing so, the load spectra describe a time-related portion of a measurement or measurement range during a gear mechanism operation. In addition, the analysis unit 110 has a bus interface and, according to an advantageous embodiment, is connected via a bus system 130 to a closed-loop or open-loop controller 140 of a motor which drives the gear mechanism or of a generator which is driven by the gear mechanism.

FIGS. 2 and 3 show that the drive shaft or output shaft 201, 301 has a magnetically or optically coded section 202, 302 in a region where it passes through a respective opening in the gear mechanism housing. The coding of said section may be changed by the effect of a torque or a force on the drive shaft or output shaft 201, 301.

A magnetically coded section 202 has a specified one-dimensional or multi-dimensional magnetization profile. At the same time, a superimposed magnetic field resulting from the specified magnetization profile is proportional to a torque which acts on the drive shaft or output shaft 201. A scanning unit, which corresponds to the magnetically coded section 202 and which comprises a plurality of magnetic field sensors, for example electrical coils 203, is provided.

Furthermore, the drive shaft or output shaft can have a ferromagnetic section, the permeability of which equates to the coding. As shown in the diagram in FIG. 4, the scanning unit in this case comprises a centrally disposed excitation coil 402 for generating a magnetic flux through the ferromagnetic section of the drive shaft or output shaft 401, and a plurality of measuring coils 403 for detecting a magnetic flux which is influenced by the permeability of the ferromagnetic section.

From FIG. 3, it can be seen that an optical strain gauge 321 having a multiplicity of reflection points is disposed in an optically coded section 302 of the drive shaft or output shaft 301, the spacing of which reflection points may be changed by the effect of a torque or a force on the drive shaft or output shaft 301. In this case, the scanning unit comprises a light source 302 which is aligned with the reflection points and has an integral light sensor for determining the wavelength of light reflected by the reflection points.

Figure 5:
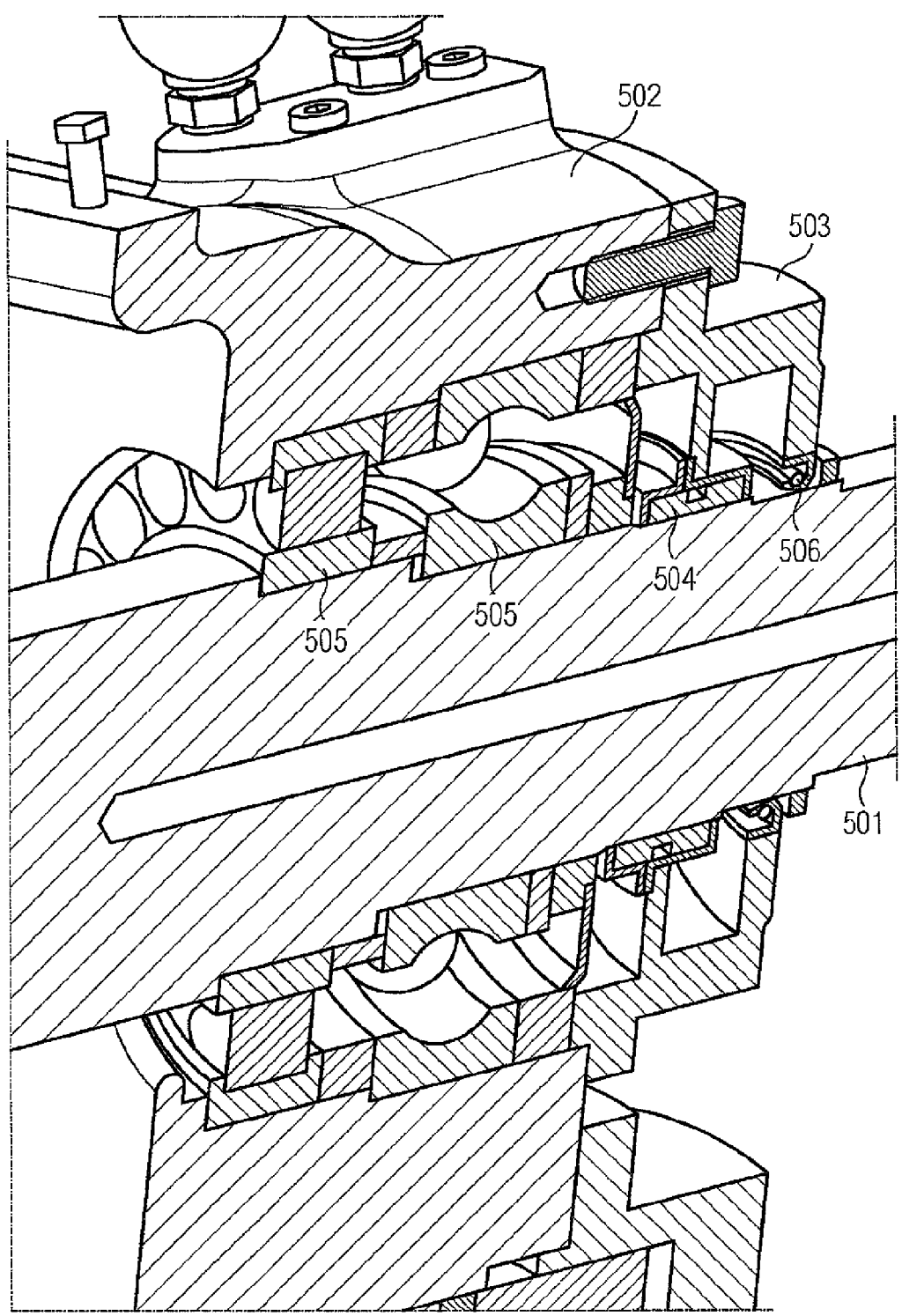
FIG. 5 shows a perspective view of a scanning unit disposed in a housing cover.

The scanning unit 504 shown in perspective in FIG. 5 is disposed in a housing cover 503 which surrounds the magnetically or optically coded section of the drive shaft or output shaft 501, and by means of which the gear mechanism housing 502 is sealed. Shaft bearings 505 and a contact or contact-free shaft seal 506 are also integrated into the housing cover 503. In this way, the housing cover 503 can guide roller bearings or plain bearings and absorb their supporting forces.

Figure 6:
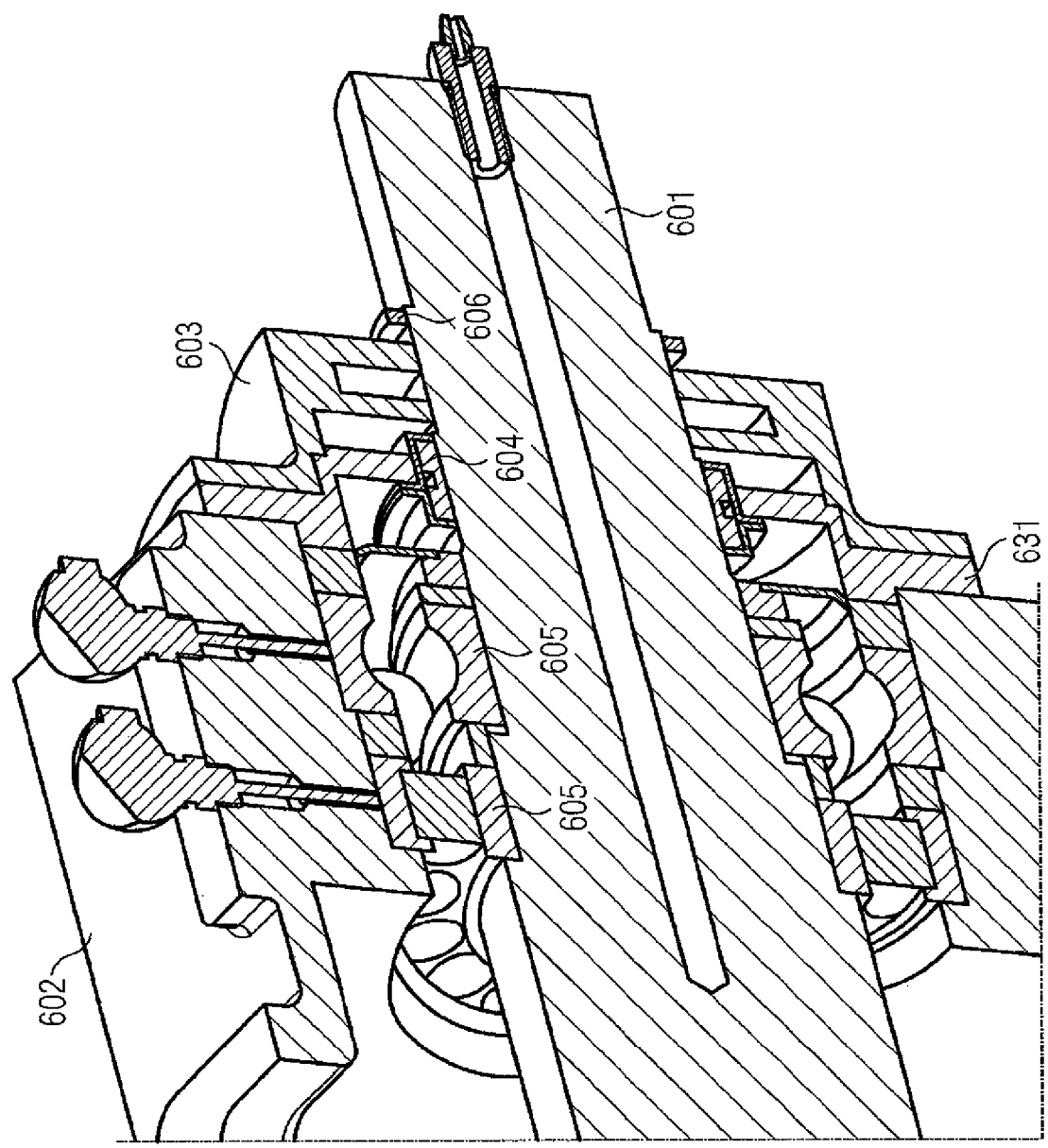
FIG. 6 shows a perspective view of a scanning unit disposed in a housing.

As an alternative to the arrangement shown in FIG. 5, according to FIG. 6, the scanning unit 604 can be disposed in a flange 631 which is securely connected to the gear mechanism housing 602 and to the gear mechanism cover 603, and which surrounds the magnetically or optically coded section of the drive shaft or output shaft 601. The flange 631 can seal the gear mechanism with contact or contact-free seals 606, and guide roller bearings or plain bearings 605 and absorb their supporting forces.

Figure 7:
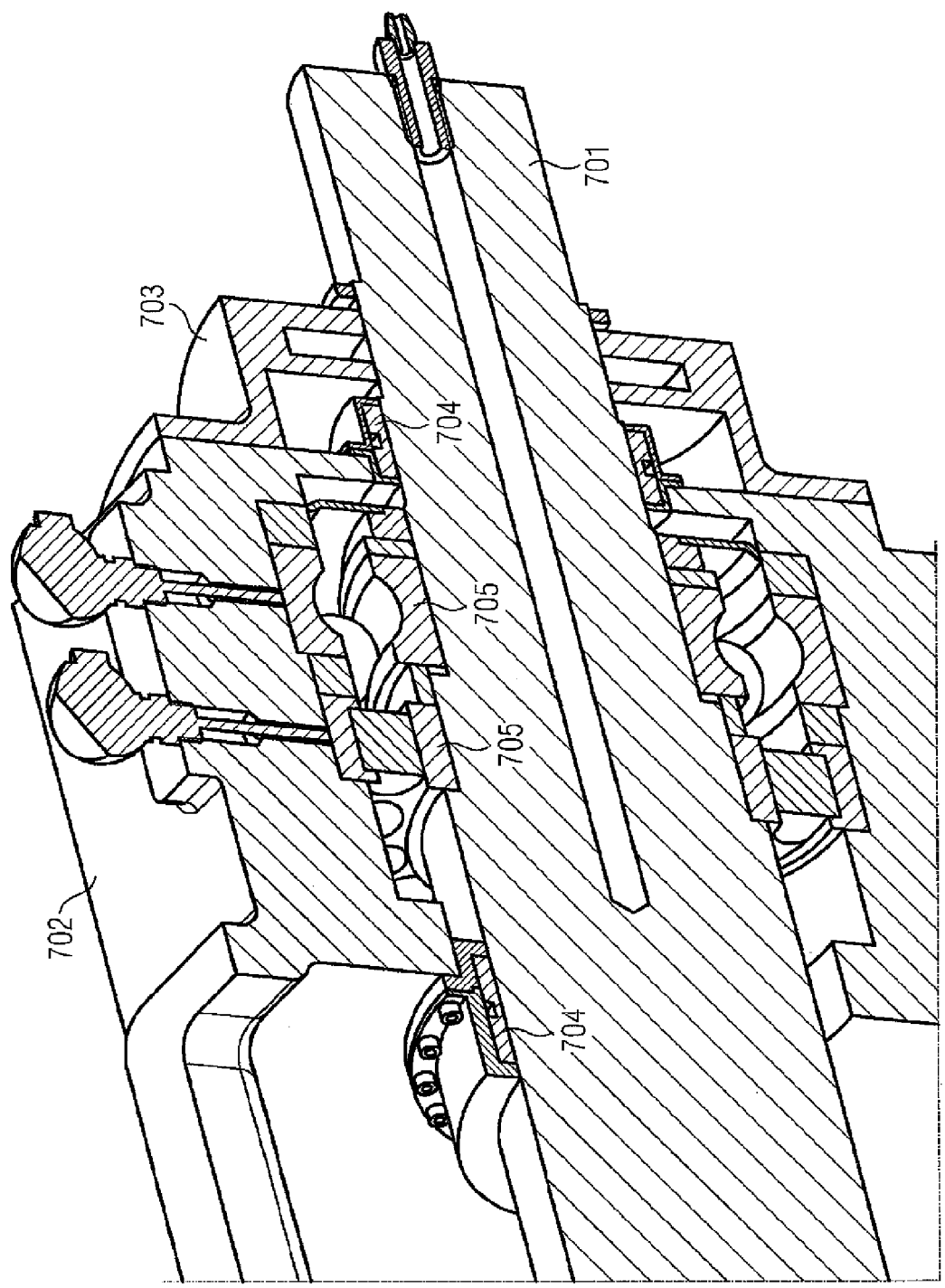
FIG. 7 shows a perspective view of a scanning unit disposed in a flange.

According to a further alternative arrangement, according to FIG. 7, the scanning unit 704 can be securely mounted in the gear mechanism housing 702 where it surrounds the magnetically or optically coded section of the drive shaft or output shaft 701. At the same time, for example, the scanning unit can also be disposed in a region between housing cover 703 and gear mechanism housing 702 which additionally guides roller bearings or a plain bearing 705 or absorbs their supporting forces.

The application of the present invention is not restricted to the exemplary embodiments described.

What is claimed is:

1. A gear mechanism for industrial applications or wind power plants comprising
   a housing;
   at least one drive shaft entering the housing through a first opening;
   at least one output shaft entering the housing through a second opening, wherein at least one member selected from the group consisting of the drive shaft and the output shaft has a section which is provided in a region of a pertaining one of the first and second openings with a coding which is changeable in response to a torque and/or a force acting on the member;
   a first gear wheel connected to the drive shaft;
   a second gear wheel connected to the output shaft, said first and second gear wheels directly or indirectly engaging with one another;
   at least one scanning unit detecting the coding on the section of the member in a contact-free fashion; and
   an analysis unit electrically connected to the scanning unit and detecting an overload of the gear mechanism.

2. The gear mechanism of claim 1, wherein the coding is magnetic.

3. The gear mechanism of claim 1, wherein the coding is optic.

4. The gear mechanism of claim 1, further comprising a housing cover connected to the housing and arranged in surrounding relationship to the section, said at least one scanning unit being disposed in the housing cover.

5. The gear mechanism of claim 1, wherein the at least one scanning unit includes a plurality of magnetic field sensors.

6. The gear mechanism of claim 5, wherein the section has a predetermined one-dimensional or multi-dimensional magnetization profile, and wherein a superimposed magnetic field resulting from the predetermined magnetization profile is proportional to a torque acting on the member.

7. The gear mechanism of claim 5, wherein the magnetic field sensors comprise electrical coils.

8. The gear mechanism of claim 1, wherein the member has a ferromagnetic section having a permeability defining the coding, said at least one scanning unit comprising an excitation coil for generating a magnetic flux through the ferromagnetic section, and a plurality of measuring coils for detecting a magnetic flux as a function of the permeability of the ferromagnetic section.

9. The gear mechanism of claim 3, further comprising an optical strain gauge having a plurality of reflecting points and disposed in the section, said reflection points being spaced by a distance which is changeable in response to a torque and/or a force acting on the member, wherein the at least one scanning unit comprises a light source aligned with the reflection points, and a light sensor for determining the wavelength light reflected by the reflecting points.

10. The gear mechanism of claim 1, wherein the at least one scanning unit is configured for detecting moments and/or positions.

11. The gear mechanism of claim 1, further comprising a shaft bearing integrated into the housing cover.

12. The gear mechanism of claim 1, wherein the housing cover comprises a shaft seal.

13. The gear mechanism of claim 1, wherein the at least one scanning unit is disposed in the housing.

14. The gear mechanism of claim 1, wherein the at least one scanning unit is disposed in a flange of the housing.

15. The gear mechanism of claim 4, wherein the at least one scanning unit is disposed in a flange of the housing cover.

16. The gear mechanism of claim 1, wherein the analysis unit comprises a memory unit for recording a gear mechanism load characteristic.

17. The gear mechanism of claim 16, wherein torque and/or force measurements representing the gear mechanism load characteristic are storable in the memory unit as load spectra which describe a time-related portion of a measurement or measurement range during a gear mechanism operation.

18. The gear mechanism of claim 1, wherein the analysis unit is connected to a closed-loop or open-loop controller of a motor driving the gear mechanism or of a generator driven by the gear mechanism.

\* \* \* \* \*